Figure 1:
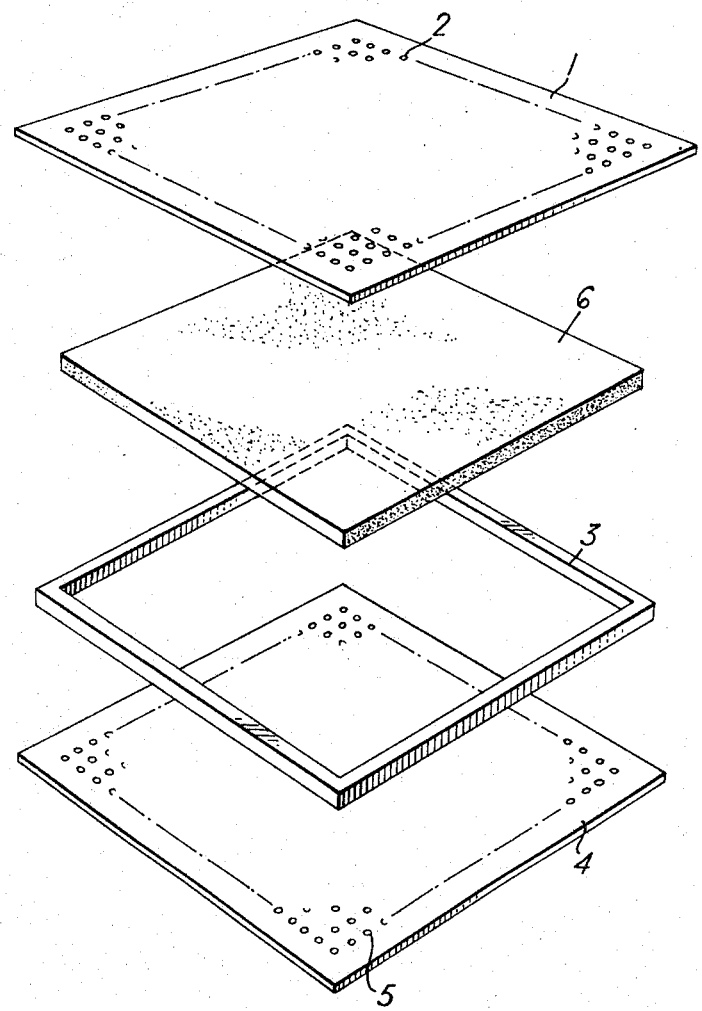

United States Patent Office 3,338,994
Patented Aug. 29, 1967

3,338,994
METHOD OF PRODUCING CELLULAR MATERIAL FROM A DISPERSION ASBESTOS FIBER
Gordon F. Heron, Hayfield, England, assignor to Turner Brothers Asbestos Company Limited, a British company
Filed Feb. 18, 1964, Ser. No. 345,693
Claims priority, application Great Britain, Feb. 21, 1963, 7,066/63
12 Claims. (Cl. 264—41)

This invention relates to the production of lightweight materials for use as thermal or acoustic insulation.

My invention comprises a series of steps. Broadly the first step involves the formation of a stable dispersion of very fine asbestos fibres with or without other fibres in water containing a surface active agent or agents. The second step involves precipitating the surface active agent or agents, bonding some at least of the fibres together in the water while maintaining them in suspension. The third step involves removing the water by heating so as to leave a dry cellular structure in which the cells are interconnecting. In this step the fibres may be and generally are further bonded together. Normally the dry cellular structure is flexible, and to obtain a rigid product it must be heated further to harden the bonds.

The nature of the asbestos fibres is an important factor in obtaining a good product. Preferably they are so fine as to form a colloidal dispersion, but a true colloidal dispersion is not essential provided that the fibres will form a substantially stable dispersion, i.e. one in which the fibres will remain in suspension for a period of hours. The fibres must have a property which may be described as "film-forming," that is to say, if the dispersion of them is spread over a flat surface and the water is evaporated the fibres will form a film which can be pulled off the surface.

The preferred fibres are chrysotile asbestos. It is well known that the ultimate asbestos fibril has a diameter of from 200 to 500 Angstroms, and that these fibrils are present in aggregates or bundles which can be progressively opened or separated from one another. Chrysotile asbestos can be colloidally dispersed with the aid of a surface active agent as described in British specification No. 689,692, and most advantageously a dispersion of this kind is used.

The dispersion may include organic or inorganic fibres that are not very fine. Thus although glass fibres produced by spinning together a large number of monofilaments emerging from a furnace to form a glass strand will not form a suitable dispersion for use in the invention, chopped glass strands or other inorganic or organic fibres, e.g. those of amphibole asbestos, or of undispersed chrysotile asbestos, may be included in a dispersion of very fine chrysotile fibres. One combination of fibres which we have found to give a satisfactory product is a mixture of equal parts by weight of chopped glass strand and chrysotile fibres.

The length of the fibres is a material factor. Chrysotile asbestos is sold in grades as follows.

| Grade: | Average length, inches |
|---|---|
| 1 | 0.4 |
| 2 | 0.3 |
| 3 | 0.23 |
| 4 | 0.12 |
| 5 | 0.06 |

I find that although all grades of chrysotile can be colloidally dispersed, only grades 1, 2, 3 and 4 can be used alone in the invention. Shorter grades (4, 5, 6 and 7) alone do not give good foamed products and can only be used in partial replacement of longer fibres. The shorter the fibre, the less can be incorporated. For example a good product can be made from 2 parts of grade 5 and 1 part of grade 2 fibre. In producing the dispersion excessive beating must be avoided, and it is not possible to use fibres of a dispersion produced simply by beating asbestos and water, with no surface active agent, since the beating then necessary to disperse them breaks them into lengths which are too short. For instance it may break them down to lengths of 100 microns.

The concentration of the fibres in the dispersion can vary considerably, but I find that in water from 1 to 5%, and preferably 2%, w./v. of grade 2 chrysotile is a very convenient figure. At 2% concentration I find that, on removal of the water, there is no appreciable change in the volume of the structure despite a loss of at least 90% of its weight. When the concentration increases to about 5% the cellular structure tends to expand during the removal of the water. A concentrated dispersion may be diluted for use. Alternatively a dilute dispersion may be concentrated for example by centrifuging, either before, or preferably after, the surface active agent or agents are precipitated. This is a very convenient means of obtaining denser, stronger products.

In making the dispersion any form of mechanical agitation, e.g. mixing, stirring or pumping, enhances the opening action of the surface active agent or agents.

A convenient way of making the dispersion is to put the asbestos fibres with any others which are to be present, into a vessel with the water and surface active agent or agents and continuously to withdraw some of the contents of the vessel by a pump working in closed circuit with the vessel. I prefer that this pump should be centrifugal as this ensures good mixing and good opening of fibre bundles.

To produce a colloidal dispersion I prefer to allow the mix of fibres, water and surface active agent or agents to stand for several hours at 60° C. although this is not absolutely necessary and then pump for 1 to 5 hours at 60° C.; the actual times will vary with fibre length and concentration. A mix which has been standing for, say, 5 hours, but not pumped, can even be used. Its characteristics are quite different from those of the colloidal dispersion, and although it probably contains a small amount of colloidally dispersed fibre the majority of fibres are not colloidally dispersed. It gives a foamed product which is of poorer quality than one produced from a colloidal dispersion.

The concentration of the fibres is a factor in determining the method of producing the dispersion. In general, when the dispersion is being made by recycling the fibres with the liquid through a pump the concentration of grade 2 fibres should preferably be no more than 10% because such dispersions have high viscosities. Shorter fibres can be used in higher concentrations.

The bonding of the fibres in the dispersion is an essential step. It is known to produce a solid product from asbestos fibres by dispersing them in water with the aid of a water-soluble soap, condensing them into a thread by passage of the dispersion through a nozzle and precipitating the soap as an insoluble compound by introducing the thread into a solution of a chemical reagent. The resultant insoluble soap binds the fibres so that they form a solid thread. In the invention I prefer to make use of a similar process to cause the fibres to coagulate or aggregate together without similarly condensing them.

In carrying out the invention in this way I rely on a surface active agent present in the dispersion to be precipitated, the dispersion at the same time being coagulated. A dispersion in water can be formed with the use of just one anionic surface-active agent, which may advantageously be that sold under the trademark "Arylan." This will in fact be precipitated on the addition of a salt of a multivalent metal to form a weak binder. However it is very much preferred to include as surface active agent a water soluble soap as this can subsequently be caused to react with a salt of a multivalent metal to produce a water-insoluble soap which serves as a very good binder. The best products are obtained when both a water-soluble soap and surface-active agent are used in forming the dispersion. For example a suitable dispersion of asbestos fibres can be formed with the use of from 5 to 15% by weight "Arylan" and from 20 to 40% by weight soap, both percentages being based on the weight of the fibre.

Examples of agents which can be used to cause the precipitation and coagulation are soluble salts of multivalent metals, for example, lead nitrate, copper sulphate, thorium nitrate or aluminium sulphate, the last being preferred.

In addition to relying on reaction between the precipitating agent and some compound which is already present in the dispersion to form the binder I may add to the dispersion some additional binder, for example, polyvinyl acetate, polyvinyl chloride, a phenol-formaldehyde resin or other polymer, or I may add some compounds which will react together to form a binder, for example ethyl silicate and sodium hydroxide.

Coagulation of the dispersions used in the process of the invention results in the production of film of fibre and not primarily in the production of bundles, although of course some such bundles will probably be formed. The degree of coagulation depends on the amount of precipitant added and can be observed visually and expressed quantitatively. On slowly adding aluminium sulphate (as the precipitating agent) to a colloidal dispersion of asbestos fibres containing sodium oleate as water soluble soap, whilst keeping the dispersion mixed and chopped, as described below, a point is reached at which (if the agitation is stopped) free water appears on the surface of the mix and film is apparent in the dispersion. On addition of more precipitant one eventually reaches the state of full coagulation, that is, the state in which the dispersion is completely broken down and there is clear separation of fibre and water. This may be referred to as 100% coagulation.

Whilst the precipitating agent is being added it is necessary to keep the dispersion thoroughly mixed, both to mix in the precipitating agent and also to disintegrate the films. This is best done by a chopping action, and I find that an ordinary high-speed mixer does not readily chop up the films but rather it is necessary to use one with cutting blades to attain adequate disintegration. I find that a very satisfactory mixer and chopper is that known as a Waring Blendor. The extent of the chopping is important. If it continues too long, the effect is the equivalent of reduction in fibre length, resulting in inferior cellular products.

During addition of precipitating agent I find that the stage at which water just begins to appear on the surface of the dispersion is at about 40 to 50% coagulation and this represents the minimum degree of coagulation for the production of satisfactory cellular products. Below this degree of coagulation, the fibres are not adequately bound together in the dispersion but only become bound after removal of the water, and poor products are generally obtained. When there is 100% coagulation the product after drying is dense but it is still a cellular product. Incomplete coagulation is therefore preferred for lightweight products and in particular 60% coagulation yields a very satisfactory cellular product. At such intermediate degrees of coagulation the films of the fibre are substantially held in a suspension and so do not settle out very rapidly. The effect of the coagulation is that while the water is being removed by heating in the subsequent step the fibres, or at least the chopped films, are held loosely apart from one another in suspension instead of collapsing as a mat, and even when there is 100% coagulation the chopping is sufficient to ensure that there are a large number of voids in the product, so that a cellular product is still formed. The mixture resulting from 100% coagulation and chopping may be regarded as comprising chopped films randomly oriented and holding each other apart.

After the addition of the precipitating agent the resultant mixture is poured into a mould of any appropriate shape. This mould should allow free liquid which has separated from the dispersion to drain and also vapour to escape, and accordingly it is preferred that it should have appropriate drainage holes, although it is possible to drive all the water off as vapour. When there is drainage, as the free water drains away the mould may be topped up with more mixture. For the production of rectangular slabs of foam, a mould consisting of a rectangular top and bottom plates separated by a spacer may be used, and the bottom plate may have holes for drainage of, for example, one sixteenth of an inch diameter. The top plates may be perforated to allow the escape of vapour. The removal of the water can be effected satisfactorily by heating the mould at a temperature between 200 and 300° C., 280° C. being particularly suitable when asbestos fibres are being used. The time depends on the type of oven used, and especially on the degree of ventilation. Initially the temperature in the mould rises to 100° C. and remains at this figure until the product is dry; this product is soft, flexible and light in colour. The temperature in the mould then rises to 280° C., and after being baked at this temperature for several minutes the product is stiff, hard and dark brown. Again, the time does depend on the furnace used. Removal of the water can of course be effected at lower temperatures and also below atmospheric pressure if desired, although baking at high temperature is usually necessary for a short period to harden the binding agent.

In order to assist in the removal of the product from the mould, the surface of the mould may be coated with a release agent, which will of course vary with the material of which the mould is made. For example certain silicone emulsions are satisfactory release agents for use in aluminium moulds.

Instead of being poured into a stationary mould, the coagulated mixture may be poured into a channel-shaped mould formed by an endless travelling band which passes through heating chambers, with the result that a continuous dry cellular slab is produced and can be cut into appropriate lengths.

The precise mechanism by which the bonding is effected is not wholly clear. When an insoluble soap is produced it precipitates onto the fibres to assist in the initial bonding, which is strong enough to hold the fibres together as films in the aqueous medium and give structure to the final foam. On heating to remove the water, the bonding is strengthened. On the removal of the water from a partially coagulated suspension the dispersed uncoagulated fibres also tend to form films. The particles of film produced by the coagulation consist of very fine fibres tangled together, as shown by electron microscopy. Films produced by drying also consist of intertangled fibres. I find that on heating the foamed product at 500° C. in air it retains its structure and a substantial proportion of its strength. Clearly at such a high temperature all the organic matter in the soap will have been burnt away, so it appears that once the product is formed the physical entanglement of the fine asbestos fibres is sufficient to hold them into films and to hold the particles of film together. Alternatively it may be that some chemical compound is formed in which asbestos fibres are linked to each other through the multivalent metal ions remaining from the insoluble soap.

I may introduce various materials to modify the properties of the final product, and these may be introduced into the water before or after the dispersion is formed. For example colloidal silica is known to have some strengthening action on asbestos and may be used, as may boron and graphite for the purpose of improving the resistance to heat. Yet again I may include substances of the kind commonly added to polymer foams as expanding agents, an example being ammonium carbonate. Foamable polystyrene beads may also be added.

Figure 2:
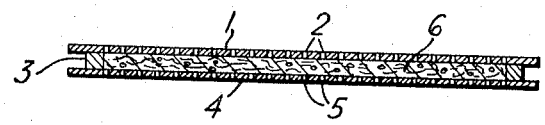

An example of the invention will now be given, and in this reference is made to the accompanying drawings which show, in FIGURE 1 an exploded view of a filled mould after formation of the cellular product, and in FIGURE 2 a cross section of the filled mould.

A colloidal dispersion of grade 2 chrysotile asbestos fibres in water is prepared by adding the fibres to an aqueous solution of an anionic surface-active agent ("Arylan") and a hard soap (sodium oleate) in the following proportions:

| | Pts. wt. |
|---|---|
| Asbestos | 20 |
| Soap | 8 |
| Arylan | 1.2 |
| Water | 1,000 | and then allowing the mix to stand for 2 hrs. at 60° C., and then mixing it for 1 hr. at 60° C. by circulating through a centrifugal pump. The 2% dispersion produced is a viscous white colloidal dispersion. This is then partially coagulated by addition of aluminium sulphate solution (3.2 cc. of a 5% solution of aluminium sulphate in water per 100 cc. of dispersion). This results in coagulation of fibres and precipitation of aluminium oleate as binder. During the addition, the mix is kept well stirred and the films produced are chopped by means of a Waring Blendor. After the coagulation the mix is transferred to the mould illustrated. This is formed of a top plate 1 and a base plate 4 separated by a spacer 3. The top plate 1 has holes 2 to allow evaporation of water, and the base pate 4 has holes 5 to allow drainage and evaporation. To make a cellular product 6, which is 12″ x 12″ x ½″ thick, the plates 1 and 4 are 13″ x 13″ flat aluminium sheets (⅛″ thick), through which 1/16″ holes are drilled at a spacing of two or three to the inch, and the spacer is made from four 12″ long, ½″ square section steel bars, welded together at their ends to form a 12″ square.

In carrying out the process, the spacer 3 is laid on the base plate to form an open box 1 ft. square x ½″ deep and the partially coagulated mix is poured into the box so formed. When excess water has drained off the box is topped up with more mix and the top plate 1 is then laid on top of the spacer and the assembled mould transferred to a ventilated oven held at 280° C., and heated for 2½ hrs. Water is removed partly by evaporation and partly by drainage through the holes in the base plate, but no dispersion is lost by drainage.

The product 6 is a lightweight cellular asbestos board containing about 10% organic matter and having the following properties:

| | |
|---|---|
| Density (lb./cu. ft.) | 2 |
| Thermal conductivity (B.t.u. in./sq. ft. ° F. hr.) | 0.4–0.45 |
| Punch-shear strength (p.s.i) | 1,000 |

The product retains its structure and a high proportion of its strength after heating at 500° C. It does not collapse on heating at 900° C. but has very low strength.

It is possible to reduce considerably the time of heating necessary by the use of very well-ventilated ovens.

I claim:

1. A method of producing a cellular material for use as thermal or acoustic insulation comprising forming a stable dispersion of film-forming asbestos fibres in water with the use of at least one precipitatable surface active agent, adding an agent to the dispersion to coagulate the dispersion and precipitate surface active agent which forms a bond between said fibres, while continuously disintegrating the films formed, introducing the resultant mixture into a mould, and heating it in the mould to remove water and leave a dry cellular structure.

2. A method according to claim 1 in which the dry cellular structure is baked at elevated temperature to harden the bonds and make it rigid.

3. A method according to claim 1 in which the dispersion additionally contains dispersed fillers other than film forming asbestos fibres.

4. A method according to claim 1 in which the dispersion contains a water soluble soap as a surface active agent.

5. A method according to claim 4 in which the agent added to the dispersion to precipitate the soap and to coagulate the dispersion is a water soluble salt of a multivalent metal.

6. A method according to claim 4 in which the dispersion also contains an additional anionic surface active agent.

7. A method of producing a cellular slab for use as thermal or acoustic insulation which comprises dispersing asbestos in water with the use of a water-soluble soap to produce a stable dispersion of film-forming fibres, adding a soluble salt of a multivalent metal to react with the soap and partially to coagulate the fibres in the dispersion to form films, disintegrating the films by a chopping action, pouring the resultant mixture of fibres and chopped films into a mould from which liquid and vapour can escape, heating the mould to drive off the water and to leave a dry cellular structure, and baking this structure at a temperature between 200 and 300° C. to form a slab.

8. A method according to claim 7 in which an additional anionic surface active agent is used in the formation of the dispersion.

9. A method according to claim 7 in which the water soluble soap is sodium oleate and the water soluble salt of a multivalent metal is aluminum sulphate.

10. A method according to claim 7 in which the dispersion additionally contains dispersed particles other than film-forming asbestos fibres.

11. A method according to claim 7 in which the mixture resulting from the disintegration of the films is drained to remove water before being poured into the mould.

12. A method according to claim 1 wherein an amount of said coagulation agent sufficient to achieve from about 40% to about 100% coagulation is added.

References Cited

UNITED STATES PATENTS

| 2,068,219 | 1/1937 | Badollet | 162—155 XR |
| 2,146,749 | 2/1939 | Knight | 210—204 |
| 2,198,800 | 4/1940 | Badollett | 162—155 XR |
| 2,626,213 | 1/1953 | Novak | 162—155 |
| 2,940,892 | 6/1960 | Feigley et al. | 162—155 XR |
| 2,948,641 | 8/1960 | McCluer | 106—15 XR |
| 3,006,805 | 10/1961 | Waggoner | 162—145 XR |
| 3,062,701 | 11/1962 | Novak | 162—155 XR |

ALEXANDER H. BRODMERKEL, *Primary Examiner.*

P. E. ANDERSON, *Assistant Examiner.*